(12) United States Patent  
Alappat et al.

(10) Patent No.: US 6,629,181 B1
(45) Date of Patent: Sep. 30, 2003

(54) INCREMENTAL BUS STRUCTURE FOR MODULAR ELECTRONIC EQUIPMENT

(75) Inventors: Kuriappan P. Alappat, Portland, OR (US); James H. McGrath, Jr., Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/527,942

(22) Filed: Mar. 16, 2000

(51) Int. Cl.[7] .............................................. G06F 13/00
(52) U.S. Cl. ......................................... 710/300; 439/55
(58) Field of Search ................................ 710/300–304, 710/305–317; 439/55

(56) References Cited

U.S. PATENT DOCUMENTS

| | | |
|---|---|---|
| 5,201,038 A | 4/1993 | Fielder |
| 5,260,854 A | * 11/1993 | Hileman et al. ............ 361/736 |
| 5,930,496 A | * 7/1999 | MacLaren et al. ............ 439/55 |

FOREIGN PATENT DOCUMENTS

| | | |
|---|---|---|
| DE | 3612034 A1 | 10/1987 |
| WO | WO 01/04764 A1 | 1/2001 |

* cited by examiner

*Primary Examiner*—Rupal Dharia
(74) *Attorney, Agent, or Firm*—William K. Bucher; Francis I. Gray

(57) ABSTRACT

An incremental bus structure for a modular measurement instrument includes interface connector structural elements interconnecting segments of a system bus. The system bus contains electrically conductive lines with the system bus having at least one subset of N electrically conductive lines. Each interface connector is part of a measurement module and has at least one set of N electrically conductive input and output contacts corresponding with the N electrically conductive lines. The first input contact of the set of N contacts for each connector is coupled to an electronic element associated with its measurement module and the second and subsequent input contacts are connected to the first and subsequent output contacts.

20 Claims, 5 Drawing Sheets

INCREMENTAL BUS STRUCTURE FOR MODULAR ELECTRONIC EQUIPMENT

BACKGROUND OF THE INVENTION

The present invention related generally to bus structures for electronic equipment and more particularly to an incremental bus structure for modular electronic equipment, such as measurement test instruments.

Typical electronic equipment buses, such as Compact PCI, VXI, VME and the like, have fixed bus structures that couple system wide buses and resources to various electronic modules in the electronic equipment. A typical instrument bus structure includes a number of electrically conductive lines incorporated into a mother board or backplane of the electronic equipment. Electrical connectors are electrically coupled in parallel to the bus lines with the connectors defining card or electronic module slots in the equipment. The bus structure includes lines defining address and data buses and lines for system wide resources, such as an audio bus, triggers, power supply voltages, reference clock, and the like. The electronic modules have electrical contacts that are electrically connected to the various electrical connectors. In a typical personal computer configuration, the electronic modules or cards may include a video processing and display card, a graphics accelerator card, I/O card, sound card, and the like. For measurement test equipment, the electronic modules or cards may include a central processing unit (CPU), video processing and display card, I/O card and various measurement signal generating, receiving and processing modules or cards. A characteristic of these types of bus structures is that the number of card or electronic module slots, as defined by the electrical connectors, is fixed by the manufacturer of the electronic equipment. This, in turn, defines the physical size of the instrument regardless of the number of modules or cards connected to the instrument bus.

Another type of measurement instrument uses an I/O bus to connect an electronic module or card to a system processor. The electronic module or card is usually a measurement specific card, such as an optical time domain reflectometer, metallic time domain reflectometer, or the like. Examples of such measurement test equipment having fixed bus structures are the model N1610A Service Advisor Portable Test Tablet, manufactured and sold by the Hewlett-Packard Company, Palo Alto, Calif., and the model FTB-300 UTD mainframe, manufactured and sold by EXFO Electro-Optical Engineering, Inc. Vanier, Quebec, Canada.

Both the N1610A and the FTB-300 UTD are base platforms that receive the measurement specific modules. Both platforms have a front panel display output, basic front panel controls, a controller operating under control of Window-based software, and a specified number of measurement module slots. The N1610A has two module slots that accept either two single wide plug-in modules or one dual width plug-in module. The FTB-300 UTD has three module slots that accept up to three single slot modules or a three slot wide single module. The fixed number of slots in these instruments do not allow for expanding the number of modules in the instrument without redesigning the instrument.

Another type of bus is the Universal Serial Bus (USB) bus that has a host controller and one or more hubs. The USB bus is a four line bus for power, ground and a bi-directional differential communications. The USB bus is connected from the controller to a first hub via a four wire USB cable connected to respective USB connectors. The hub may have multiple outputs that allow connections to other devices. The controller talks to the hub and dynamically assigns addresses for each hub output. Additional hubs connected to the first hub will dynamically assigned addresses by the controller. The controller communicates with a system processor, such as a PENTIUM® microprocessor, while the hub outputs may be coupled to digital signal processors that acquire and process measurement data. While the USB bus allows for connecting a large number of device to the bus, it has the drawback of a high software overhead to control the dynamic addressing of the hub outputs and the flow of data over the communications line. Additionally, the USB bus requires specific USB controller and USB hub chip sets. Further, all communications over the bus has to pass through the USB bus controller.

What is needed is a bus structure that is not limited to a predefined number of slots, as defined by electrical connectors on a mother board, back plane or I/O interfaces. The bus structure should be expandable to accept any number of cards or modules but not encumbered by high software overhead or the need for specialized chip sets. The bus structure should also connect directly to system controller and not restricted to an intermediate controller.

SUMMARY OF THE INVENTION

Accordingly, the present invention is an incremental bus structure that includes a system bus having a plurality of electrically conductive lines and at least a first incremental bus structure element. In the preferred embodiment of the invention, the bus structure is implemented using at least one bus structure element in a modular measurement instrument that includes a base unit and one or more measurement modules. The incremental bus structure provides system bus resources to and from the base unit and measurement modules via the incremental bus structure elements. The incremental bus structure element includes an interface connector having at least first and second electrically conductive input contacts and first and second electrically conductive output contacts with the second input contact connected to the first output contact. A first of the system bus electrically conductive lines is coupled through the first input contact of a first interface connector to a first electronic element and a second of the electrically conductive lines is coupled through the second input contact to the first output contact.

The bus structure element is preferably constructed with an input interface connector having the first and second electrically conductive input contacts and an output interface connector having the first and second electrically conductive output contacts. A flexible substrate having at least first and second electrically conductive lines formed thereon connects the input and output interface connectors together. Respective ends on one side of the first and second electrically conductive lines are electrically connected to the respective first and second electrically conductive input contacts of the input interface connector. The other end of the first electrically conductive line is coupled to an electronic element and the other end of the second electrically conductive line is connected to the first electrically conductive output contacts of the output interface connector.

The incremental bus structure is expandable to include a second interface connector having at least first and second input contacts and first and second output contacts with the first and second output contacts of the first interface connector electrically coupled to the first and second input contacts of the second interface connector. The second input contact of the second interface connector is connected to the first output contact of the second interface connector. The second electrically conductive line of the system bus is coupled through the first input contact of the second interface connector to a second electronic element. Various types of electrical signals, such as address signals, clock signals, request service signal, and power-on signals, may be passed on to the first and second electronic elements via the first and second electrically conductive lines of the bus structure. The electronic elements may include controllers, power supplies and the like The incremental bus structure is implemented in a modular measurement instrument that includes a base unit having an instrument bus consisting of electrically conductive lines that are electrically coupled to corresponding electrically conductive contacts of an instrument bus interface connector. In the preferred embodiment of the invention, the instrument bus has at least one subset of N electrically conductive lines. At least a first measurement module having an interface connector containing input and output electrically conductive contacts is plugged into the base unit with the input electrically conductive contacts of the first measurement module interface connector being electrically coupled to the electrically conductive contacts of the instrument bus interface connector. The measurement module interface connector has at least one subset of N input and output electrically conductive contacts corresponding with the subset of N electrically conductive lines. The first input electrically conductive contact of the subset is electrically coupled to electronic elements in the measurement module and the second and remaining input electrically conductive contacts of the subset are offset and electrically coupled to the first and subsequent output electrically conductive contacts of the subset.

The bus structure in the modular measurement instrument may further include a plurality of subsets of N electrically conductive lines with the measurement module interface connector having corresponding sets of N input and output electrically conductive contacts. The first input electrically conductive contact of each subset in the measurement module interface connector is electrically coupled to the electronic elements in the measurement module and the second and remaining input electrically conductive contacts of each subset in the measurement module interface connector are offset and electrically coupled to the first and subsequent output electrically conductive contacts of each subset.

The modular measurement instrument may include additional measurement modules with each module having an interface connector containing input and output electrically conductive contacts. The input electrically conductive contacts of each of the additional measurement module interface connectors are electrically coupled to the output electrically conductive contacts of another of the measurement module interface connectors. Each of the measurement module interface connectors has at least one subset of N input and output electrically conductive contacts corresponding with the subset of N electrically conductive lines. The first input electrically conductive contact of the subset for each measurement module interface connector is electrically coupled to the electronic elements in the corresponding measurement module and the second and remaining input electrically conductive contacts of the subset are offset and electrically coupled to the first and subsequent output electrically conductive contacts of the subset. The instrument bus may also be implemented with a plurality of subsets of N electrically conductive lines in a modular measurement instrument with additional measurement modules. Each of the additional measurement module interface connectors have corresponding subsets of N input and output electrically conductive contacts. The first input electrically conductive contact of each subset in each of the measurement module interface connectors is electrically coupled to the electronic elements of the corresponding measurement module and the second and remaining input electrically conductive contacts of each subset in each of the measurement module interface connectors are offset and electrically coupled to the first and subsequent output electrically conductive contacts of each subset.

Where the incremental bus structure has a plurality of subsets of N electrically conductive lines, the bus structure elements in the form of the measurement module interface connectors has corresponding plurality of subsets of N input and output electrically conductive contacts. The flexible substrate also includes the electrically conductive lines having a plurality of subsets of N electrically conductive lines corresponding to the subsets of N electrically conductive lines of the instrument bus. The first ends of the subsets of N electrically conductive lines are electrically connected to the corresponding electrically conductive input contacts of the input interface connector. The other ends of each of the first electrically conductive lines of each of the plurality of subsets of N electrically conductive lines are coupled to the electronic elements of the corresponding measurement module and the other ends of the second and subsequent electrically conductive lines of each of the plurality of N electrically conductive lines are offset and connected to the first and subsequent electrically conductive output contacts of the output interface connector.

The subsets of N electrically conductive lines may be address lines, clock signal lines, power-on signal lines and/or request service lines, with a first of the electrically conductive lines of each of the subset respectively coupling an address signal, a clock signal, and a power-on signal to the measurement module and a request service signal from the measurement module. The objects, advantages and novel features of the present invention are apparent from the following detailed description when read in conjunction with the appended claims and attached drawings.

DETAILED DESCRIPTION OF THE PREFERRED EMBODIMENT

Figure 1:
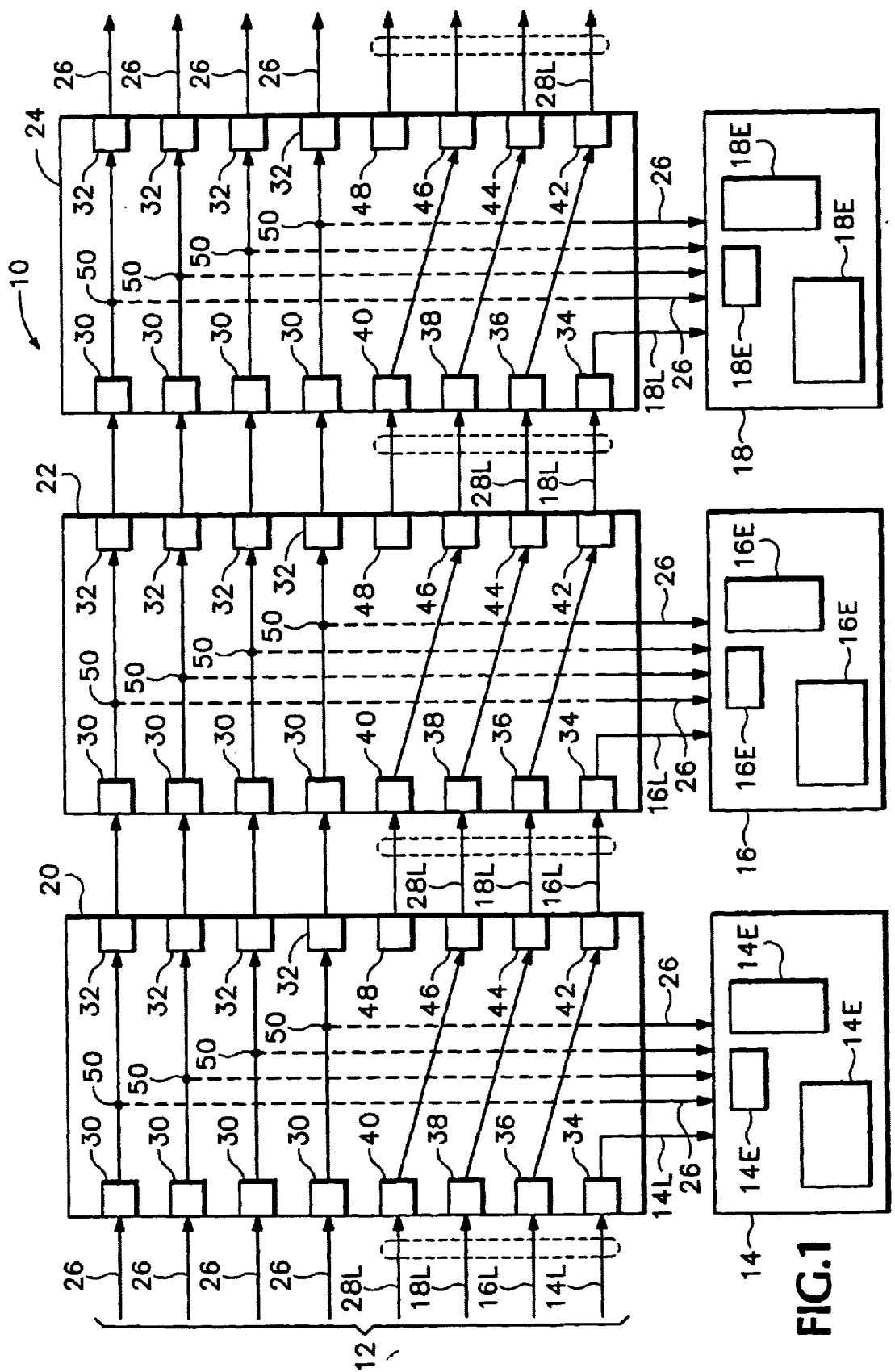
FIG. 1 is a simplified diagrammatic representation of the incremental bus structure according to the present invention.

Referring to FIG. 1 there is simplified diagrammatic representation of the incremental bus structure 10 according to the present invention. The incremental bus structure 10 includes a system bus 12 and at least one or more incremental bus structure elements 20, 22 and 24. The bus structure elements 20, 22 and 24 incrementally extend the system bus 12 for connecting any number of electronic modules or cards, as represented by modules 14, 16 and 18, to the bus 12. The system bus 12 provides module specific and common resources to the modules or cards 14, 16 and 18 through the bus structure elements 20, 22 and 24. Common system resources may include, but not limited to, power supply voltages, electrical ground, data and audio signals and the like. Module specific resources may include, but not limited to, module addresses, module service requests, module power-on signals, system clock and the like. The system bus 12 includes one or more sets of module specific electrically conductive lines having N lines, as represented by lines 14L, 16L, 18L and 28L, that couple the module specific resources to the appropriate modules. The system bus 12 also includes common electrically conductive lines 26 that couple the common resources to the modules 14, 16 and 18.

Each incremental bus structure element has at least one set of N input electrically conductive contacts 34, 36, 38 and 40 and N output electrically conductive contacts 42, 44, 46 and 48 for coupling the set of module specific electrically conductive lines 14L, 16L, 18L and 28L to the appropriate modules 14, 16, and 18. N is a integer value greater than one and sets an upper configuration limit for the number of modules or cards that can be connected to the incremental bus structure 10. For example, if N is equal to six, then there are six module specific electrically conductive lines on the system bus 12, and six input and output electrically conductive contacts on the incremental bus structure elements associated with the module specific lines. Each module specific electrically conductive line is capable of being coupled through the input and output electrically conductive contacts of the bus structure elements to a specific module or card up to six modules. Each incremental bus structure element 20, 22 and 24 also includes common input and output electrically conductive contacts, respectively number 30 and 32, for coupling the common electrically conductive lines 26 from module to module. The common resources of the system bus 12 may be tapped off the system bus 12, as represented by connections 50, and coupled to the connected modules.

As shown in FIG. 1, the first input electrically conductive contacts 34 of the set of N input contacts in each of the bus structure elements 20, 22 and 24 are respectively connected to their associated modules 14, 16 and 18. The second input electrically conductive contacts 36 of the set of N input contacts in each of the incremental bus structure elements 20, 22 and 24 are electrically connected to the first output electrically conductive contacts 42 of the set of output contacts of their respective bus structure elements 20, 22 and 24. Likewise, the other input electrically conductive contacts 38 and 40 of the set of N input contacts are offset and electrically coupled to the output electrically conductive contacts 44 and 48 of the set of N output contacts. As a result, the electrically conductive lines carrying the module specific resources of the system bus 12 are connected in a sequential order to the modules connected to the system bus 12. For example, electrically conductive lines 14L, 16L, 18L and 28L may be address lines providing address signals to respective electronic elements 14E, 16E and 18E in modules 14, 16 and 18. The electronic elements 14E, 16E and 18E may be a controller or buffer circuits coupled to the controller. In the configuration of FIG. 1, the first address line 14L is coupled though the first electrically conductive contact 34 of the bus structure element 20 to the electronic elements of the module 14. The second address line 16L is coupled through the second input electrically conductive contact 36 and the first output electrically conductive contact 42 of bus structure element 20 to the first input electrically conductive contact 34 of bus structure element 22. The second address line 16L is coupled from the first electrically conductive contact of bus structure element 22 to the electronic elements of module 16. Likewise, the third address line 18L is coupled through the input and output electrically conductive contacts 38 and 44 of bus structure element 20, electrically conductive contacts 36 and 42 of bus structure element 22 and electrically conductive contact 34 of bus structure element 24 to the electronic elements of module 18. Further, the fourth address line 28L is coupled through input and output electrically conductive contacts 40 and 46 of bus structure element 20, electrically conductive contacts 38 and 44 of bus structure element 22 and the input electrically conductive contacts 36 of bus structure element 24 to the output electrically conductive contact 42. Adding an additional module by plugging-in the incremental bus structure element associated with the new module to the bus structure element 24 would couple the address line 28L to the electronic elements of the new module via the input electrically conductive element 34 of the module's incremental bus structure element.

It is important to note that the incremental bus structure design allows each module or card to have the same bus structure configuration irrespective of where the module or card is located on the system bus. That is, a module that one time is connected to address line 18L because it is the third module on the system bus 12 may just as easily be the first module on the system bus 12 and connected to address 14L. The module specific resources of the system bus 12 are incrementally assigned to each new module or card through the incremental bus structure elements 20, 22, 24 as it is connected to the bus 12. This is in contrast to a fixed bus structure design where certain system resources, such as slot addressing, system request interrupts, are preassigned to the module or card slots. The incremental bus structure 10 of the present invention simplifies module or card design by using the same incremental bus structure elements for all modules that connect to the system bus 12. Further, the incremental bus structure allows for a modular measurement instrument that does not have a minimum weight and size requirement defined by a fixed bus structure.

Figure 2:
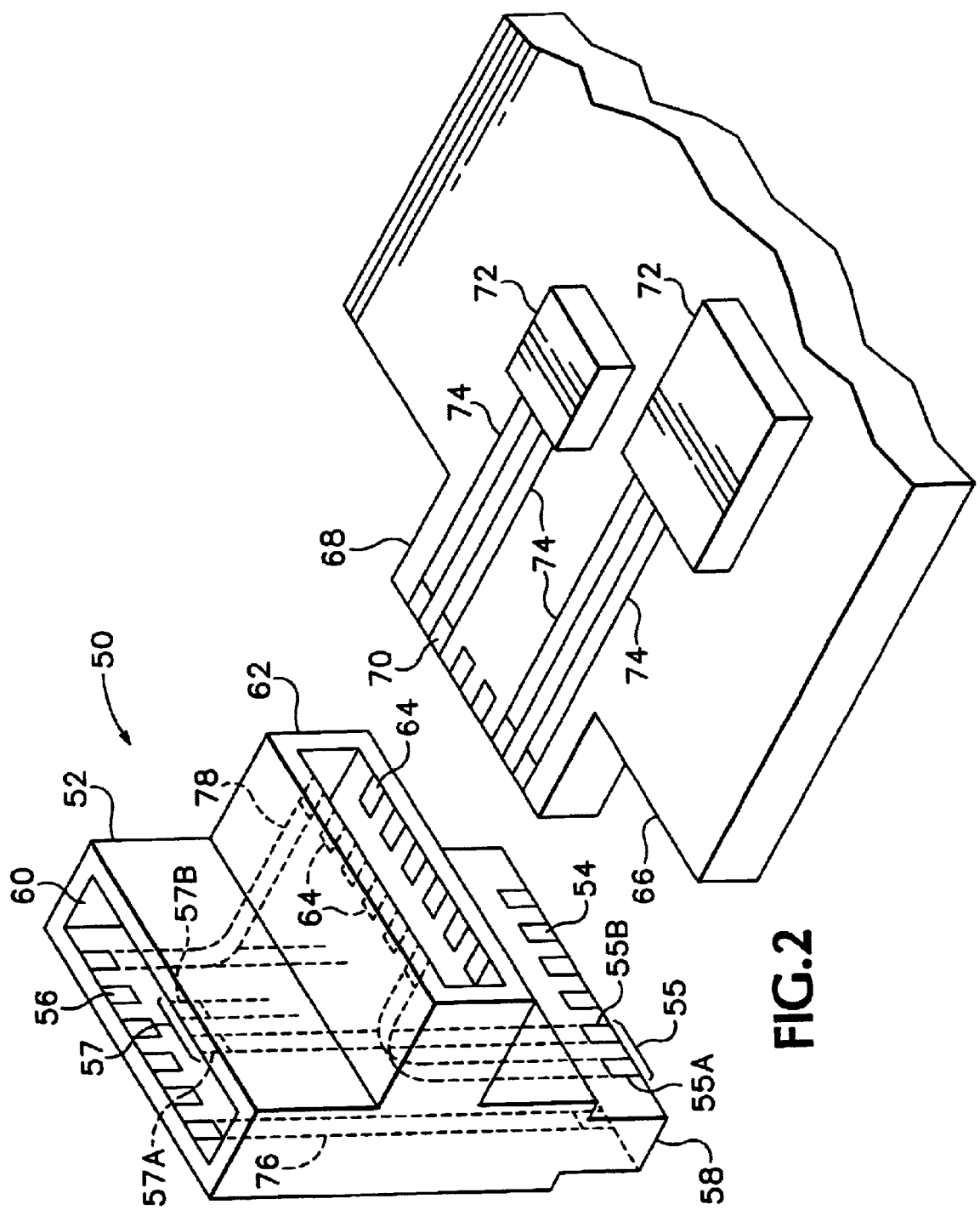
FIG. 2 is perspective view of one embodiment of an incremental bus structure element used in the incremental bus structure according to the present invention.

FIG. 2 is a perspective view of one embodiment of an incremental bus structure element 50 usable in the incremental bus structure 10 to the present invention. The bus structure element 50 has an interface connector 52 with input electrically conductive contacts 54 and output electrically conductive contacts 56. In the embodiment, as shown, the input electrically conductive contacts 54 are disposed on a male plug connector 58 and the output electrically conductive contacts 56 are disposed in a female plug connector 60. The plug configuration of the interface connector 52 may equally be reversed with the input electrically conductive contacts 54 disposed in the female plug connector 60 and the output electrically conductive contacts 56 being disposed on the male connector plug 58. A module or card plug connector 62 has electrically conductive contacts 64 that are coupled to selected input electrically conductive contacts 54. A circuit board 66 is provided with a board interface connector 68 having electrically conductive contacts 70. The electrically conductive contacts 70 mate with the electrically conductive contacts 68 to couple the module specific system bus resources and the common system bus resources to electronic elements 72 on the circuit board 66 via electrically conductive lines 74.

Electrically conductive lines 76, such as wire leads or the like, connect the input electrically conductive contacts 54 to the output electrically conductive contacts 56. In one configuration, the common system bus resources are coupled from the input electrically conductive contacts 54 to the output electrically conductive contacts 56 via the electrically conductive leads 76 being connected to the module plug connector contacts 64. In another configuration, the input electrically conductive contacts 54 receiving the common system bus resources are directly coupled to the corresponding output electrically conductive contacts 56 via the electrically conductive leads 76. The module plug connector contacts 64 are coupled to the leads 76 via electrically conductive leads 78 tapped to leads 76.

The bus structure element 50 has at least one set of N input electrically conductive contacts 55 and one set of N output electrically conductive contacts 57 corresponding to the modular specific electrically conductive leads of the system bus 12. A module specific system bus resource is coupled to one of the electronic elements 72 on the circuit board 66 via a first contact of the set of N input electrically conductive contacts, as represented by input electrically conductive contact 55A, coupled to one of the contacts 64 of plug 62 via an electrically conductive lead 76. A second contact of the set of N input electrically conductive contacts, represented by input electrically conductive contact 55B, is electrically connected to a first output contact 57A of the set of N output electrically conductive contacts. Plugging-in a male plug connector of a second bus structure element to the female plug connector 60 couples the second input electrically conductive contact 55B to the first input electrically conductive contact 55A of second bus structure element.

Figure 3:
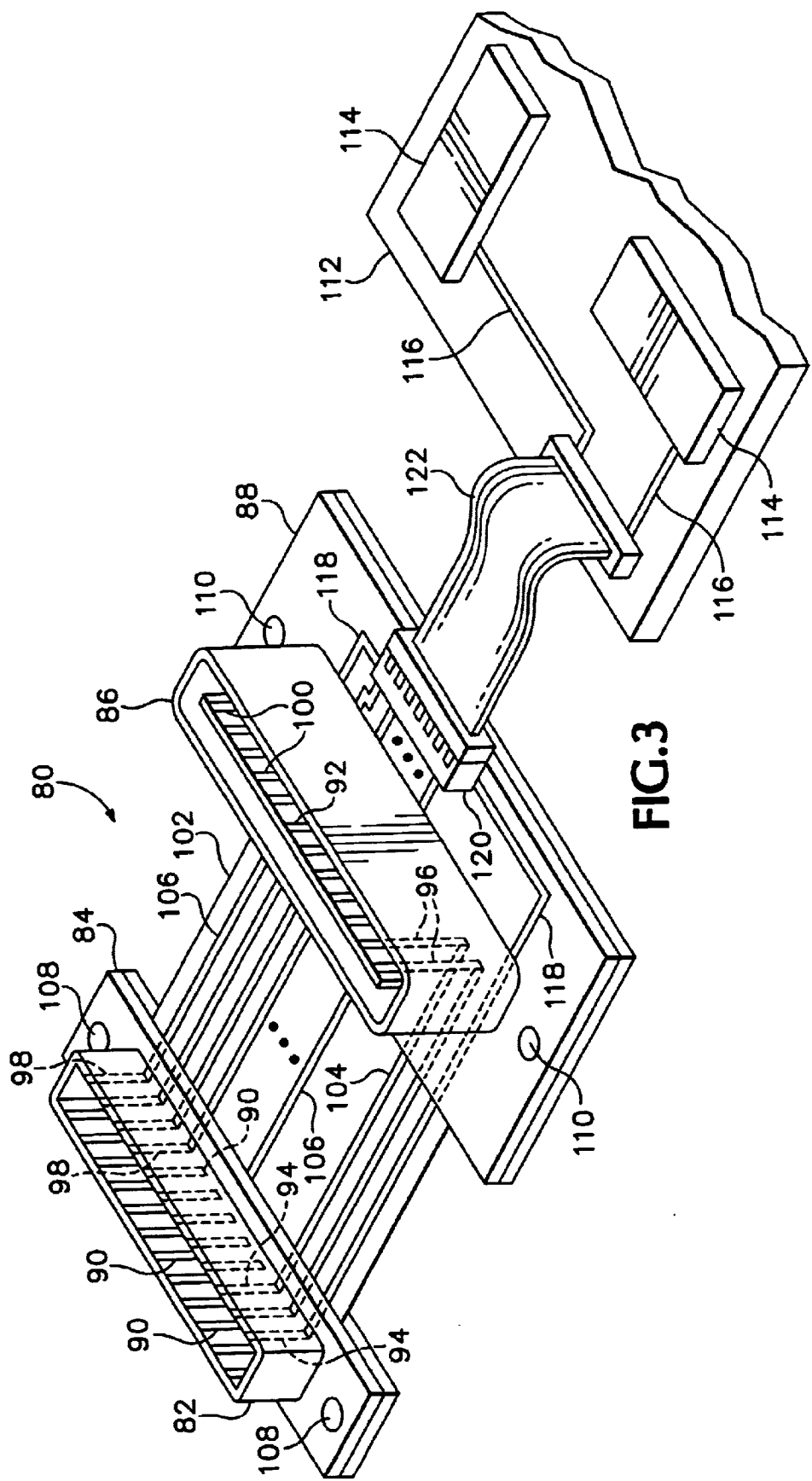
FIG. 3 is a perspective view of the preferred embodiment of the incremental bus structure element used in the incremental bus structure according to the present invention.

Referring to FIG. 3, there is shown a perspective view of the preferred embodiment of an incremental bus structure element 80 used in the incremental bus structure 10 according to the present invention. The incremental bus structure element 80 has an input interface connector 82 mounted on a first substrate 84, such as a printed circuit board, and an output interface connector 86 mounted on a second substrate 88, substantially similar to the first. Both the input and output interface connectors 82 and 86 have respective input and output electrically conductive contacts 90 and 92. Electrical leads (not shown) are connected to each of the respective contacts 90 and 92 and extend from the bottom of the interface connectors 82 and 84. One of the interface connectors is a male type connector and the other is a female connector. In the preferred embodiment of the invention, the input interface connector 82 is a female connector, such as manufactured by Molex Inc., Lisle, Ill. under part No. 71660-7080, and the output interface connector 86 is a male connector, such as manufactured by Molex Inc., Lisle, Ill. under part No. 71661-7080. The electrically conductive contacts 90 and 92 in the Molex connectors are integrally formed with the electrical leads extending from the bottom of the connectors. The input and output interface connectors 82 and 86 respectively have at least one set of N input electrically conductive contacts 94 and at least one set of N output electrically conductive contacts 96 for module specific system bus resources and input and output electrically conductive contacts 98 and 100 for common system resources.

The input and output interface connectors 82 and 86 are connected together by a flexible substrate 102 preferably formed using a polyamide material. The flexible substrate 102 has at least one set of N electrically conductive lines 104 for a coupling module specific resource between the interface connectors 82 and 86 and common electrically conductive lines 106 for coupling the common system resources between the interface connectors 82 and 84. The ends of the electrically conductive lines 104 and 106 are terminated in conductive pads with each pad having a hole formed therein corresponding to holes in the circuit board substrates 84 and 88 that mate with the electrical leads of the input and output interface connectors 82 and 86. In the preferred embodiment, the ends of the flexible substrate 102 are inner laminate layers of the respective circuit board substrates 84 and 88. The electrical leads extending from the bottom of the interface connectors 82 and 86 pass through the holes in the conductive pads and are electrically connected to the pad via soldering or the like.

Alternately, the circuit board substrates 84 and 88 may have electrically conductive runs formed thereon that extend from each of the electrical leads of their respective interface connectors 82 and 86 to ribbon cable connectors mounted on each substrate. A flexible cable having at least one set of N electrical wires connects the module specific electrical contacts of the input and output connectors together. The flexible cable also includes electrical wire for connecting the common electrical contacts of the input and output electrical connectors together.

Each of the substrates 84 and 88 have holes formed therein, respectively numbered 108 and 110, for mounting the bus structure element 80 in an associated module having a circuit board 112. The circuit board 112 has electronic components or elements 114 mounted thereon that receive the module specific resources and the common system resources via electrically conductive lines 116 formed on the circuit board 112. The output interface connector substrate 88 has electrically conductive lines 118 formed thereon that electrically couples the module specific system bus resources and the common system bus resources to a module connector 120, such as manufactured by Molex Inc., Lisle, Ill. under part No. 71220-2200. A flexible cable 122, such as ZIF style manufactured by Parlex Corp., Salem, N.H., couples the module specific and common system bus resources to the circuit board 112. In the preferred embodiment of the invention, the common system resources and the module specific resources for a particular module are coupled via the flexible cable 122 to the circuit board 112 in the module.

The first of the set of N electrically conductive lines 104 couples the first of the set of N input electrically conductive contacts 94 of the input interface connector 82 to the module connector 120 on the output interface connector 84 circuit board 88 via line 118. The second and subsequent electrically conductive lines of the set of electrically conductive lines 104 couple the second and subsequent input electrically conductive contacts of the N set of input electrically conductive contacts 94 to the first and subsequent output electrically conductive contacts of the N output electrically conductive contacts 96 of the output interface connector 86. The common electrically conductive lines couple the common input electrically conductive contacts 98 of the input interface connector 82 to the common output electrically conductive contacts 100 of the output interface connector 86. The common electrically conductive contacts 100 are coupled to the module connector by lines 118. Plugging another incremental bus structure element 80 associated with another module or card, connects the common system resources to the module and the module specific resource that is on the first of the N input electrically conductive contacts. The first input electrically conductive contact of the N input electrically conductive contacts of the second module is coupled back through the first output electrically conductive contact 96 of the first module output interface connector, the second electrically conductive line of the N set of electrically conductive lines 104 on the flexible substrate 102 to the second input electrically conductive contact of the N set of input electrically conductive contacts 94 in the input interface connector of the first module and to the second module specific electrically conductive line of the system bus.

Figure 4:
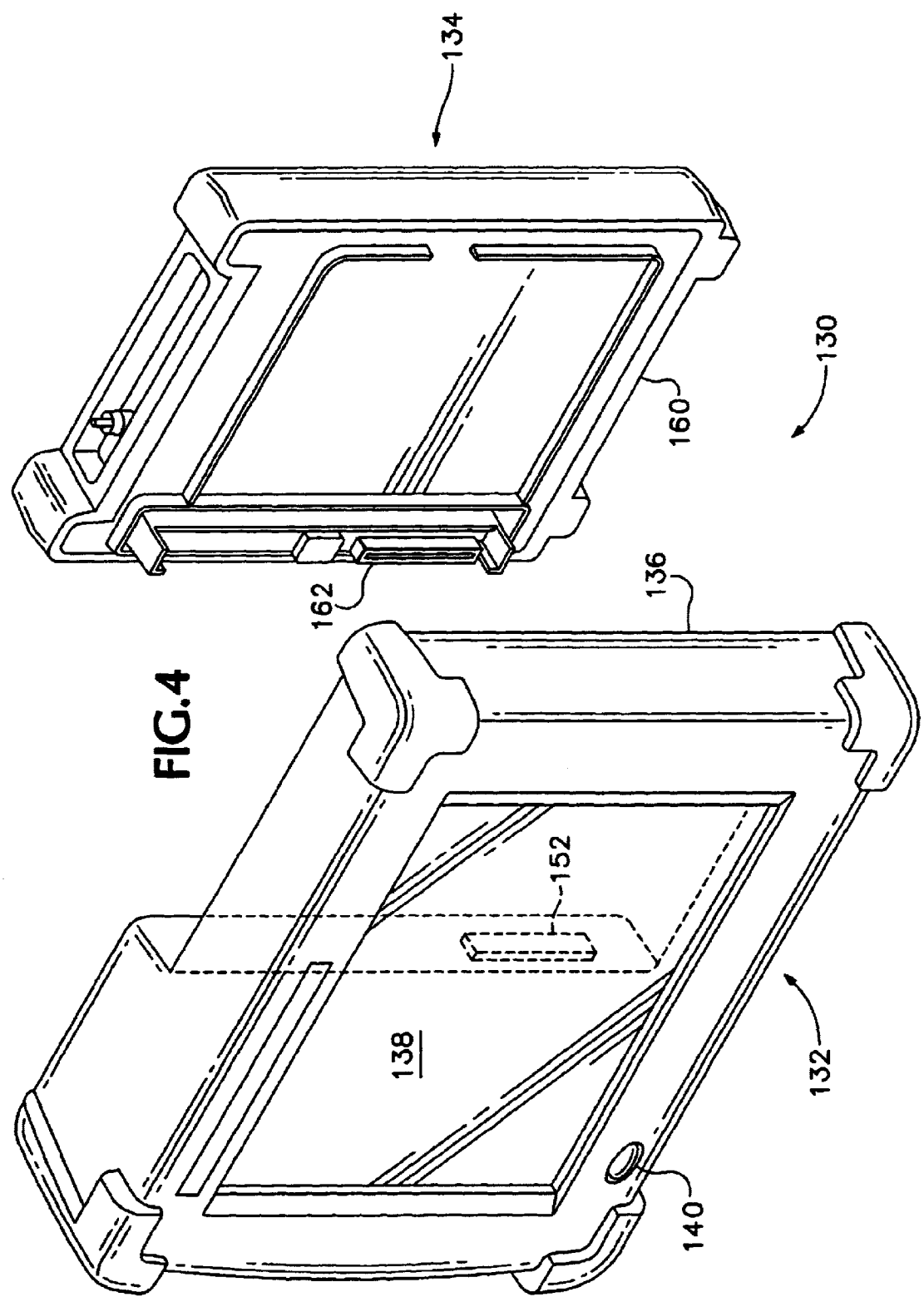
FIG. 4 is a perspective view of modular measurement instrument incorporating the incremental bus structure according to the present invention.

Referring to FIG. 4, there is shown a perspective view of a modular measurement instrument 130 incorporating the incremental bus structure 10 of the present invention. The modular measurement instrument 130 includes a base unit 132 and at least one measurement module 134. The base unit 132 includes a housing 136 in which is disposed a display 138, an on/off button 140 and a main controller circuit board 142. In the preferred embodiment of the modular measurement instrument 130, the display 138 is a liquid crystal display touch screen with control functions of the instrument are displayed on the display 138. The controller circuit board 142, as representatively shown in the block diagram of the modular measurement instrument 130 of FIG. 5, includes a controller 144 mounted on the circuit board and electrically conductive lines 146 forming an instrument bus 148. The instrument bus 148 is connected to electrically conductive contacts 150 in an instrument bus interface connector 152, such as manufactured by Molex Inc., Lisle, Ill. under part No. 71661-7080. The instrument bus 148 has at least one set of N electrically conductive lines 154 for a coupling module specific system resource to the measurement module 134 or modules 134, 168 connected to the instrument bus 148 via the electrically conductive contacts 150 of the instrument bus interface connector 152. The instrument bus 148 also includes electrically conductive lines 156 connected to the electrically conductive contacts 150 of the instrument bus interface connector 152 for coupling the common system bus resources to the module or modules 134. The instrument bus 148 implements the incremental bus structure 10 of the present invention with common system resource lines that include instrument ground and plus and minus power supply voltages and an audio bus consisting of plus and minus audio in and plus and minus audio out lines. The instrument bus 148 also include four sets of module specific system resource lines with each set having six lines allowing for up to six measurement modules to be connected to the system bus 148. The module specific resource lines include module address lines, clock lines, request service lines and power-on lines.

The measurement module 134 includes a housing 160 in which is mounted a incremental bus structure element 162, such as described above with reference to FIG. 3. The input interface connector 164 is mounted in the module 134 to connect with the instrument bus interface connector 152. The output interface connector 166 is mounted in the module 134 to connect to the input interface connector 164 of another measurement module 168.

Figure 5:
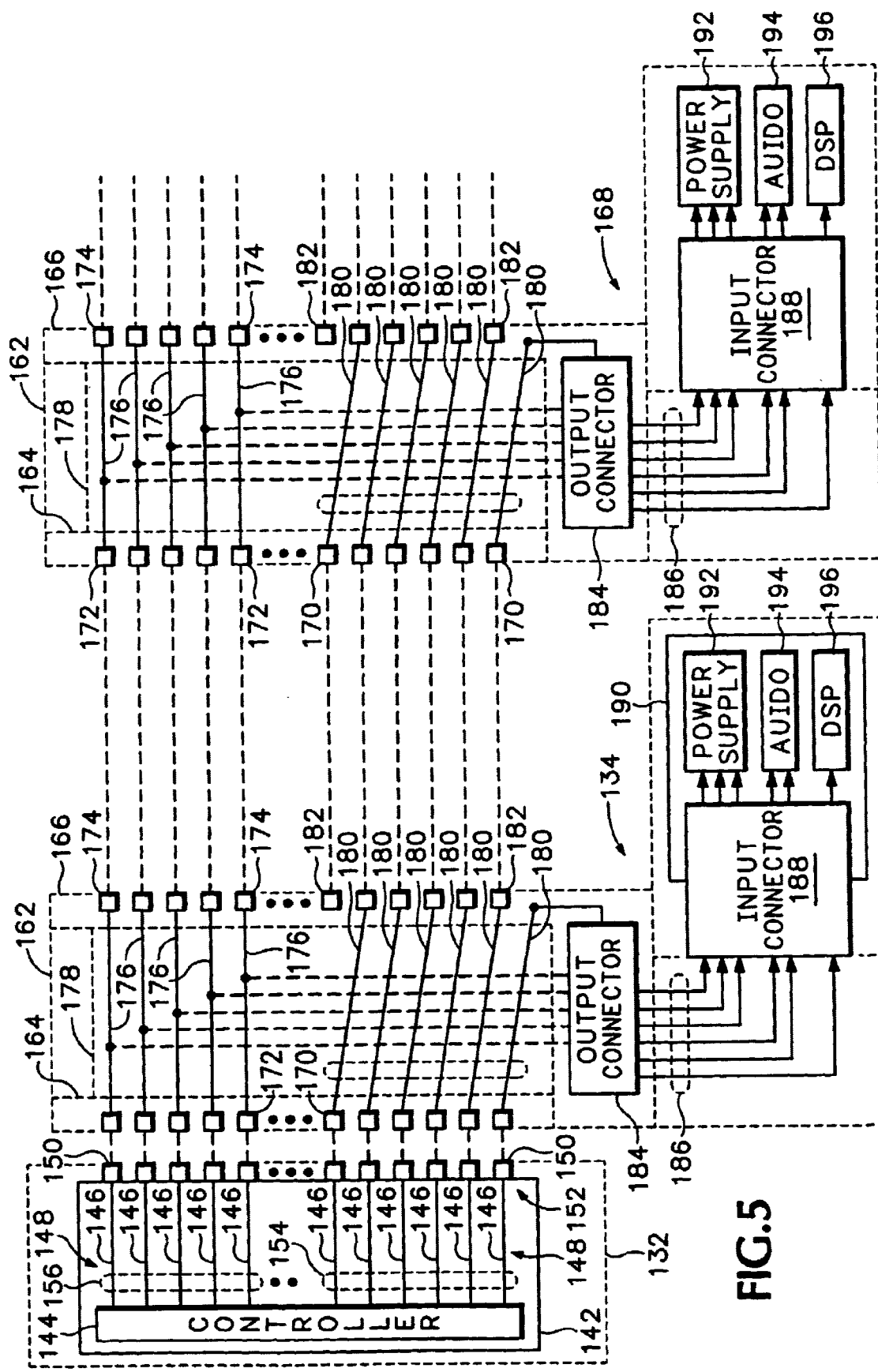
FIG. 5 is a simplified block diagram of a measurement module interface and the associated measurement module electronics incorporating the incremental bus structure according to the present invention.

For clarity of the drawing figure, the block diagram of the modular measurement instrument 130 of FIG. 5 show one of the sets of module specific system resources and a portion of the common system resources coupled to the measurement modules 134, 168. The input interface connector 164 of the incremental bus structure element 164 is plugged into the instrument bus interface connector 152. The module specific system resources electrically conductive contact 170 and the common system resources electrically conductive contacts 172 of the input interface connector 164 mate with the corresponding electrically conductive contacts 150 in the instrument bus interface connector 152. The common system resources input electrically conductive contacts 170 are coupled to the corresponding common system resources output electrically conductive contacts 174 via the electrically conductive lines 176 of the flexible substrate 178. For simplicity of the drawing figure, the common system resources are shown tapped from the electrically conductive lines 176 and connected to the output electrical connector 184 on the output interface connector circuit board. In the preferred embodiment, the common system resources are tapped from the electrically conductive lines on the output interface connector circuit board as described in relation to FIG. 3.

The module specific system resources electrically conductive contacts 170 of the input interface connector 164 are connected to the output interface connector 166 via the module specific system resources electrically conductive lines 180 on the flexible substrate 178. The first of the module specific electrically conductive contacts 170 of the input interface connector is coupled via the first module specific electrically conductive line 180 to the output electrical connector 184 on the output interface connector 166 circuit board. The second and subsequent electrically conductive contacts of the input interface connector 164 are connected via the second and subsequent module specific electrically conductive lines 180 to the first and subsequent output electrically conductive contacts 182 of the output interface connector 166. The module specific system resource and the common system resources on the output electrical connector 184 are coupled via an electrically conductive ribbon cable 186 to the input electrical connector 188 on the circuit board 190 in the measurement module 134. The power supply resources are coupled to power supply circuitry 192 on the module circuit board 190 and the audio bus resources are coupled to he appropriate audio circuitry 194. The module specific resources, such as the address resource, the clock resource and the request service resource are coupled to a digital signal processor 196 on the module circuit board 190. The power-on module specific resource is coupled to the power supply circuitry 192 to power-up the measurement module 134.

A second measurement module 168 may be connected tot he first measurement module 134 with the input interface connector 164 of the second module 168 plugging into the output interface connector 166 of the first measurement module 134. The common system resource are coupled from the first measurement module 134 to the second measurement module 168 by the connection of the common resource output electrically conductive contacts 174 to the common resources input electrically conductive contacts 172. The module specific resources are coupled from the first measurement module 134 to the second measurement module 168 by the connection of the first of the set of module specific output electrically conductive contacts 182 to the first of the set of module specific input electrically conductive contacts 170. The module specific resources for the second measurement module 168 are coupled back through the incremental bus structure element 162 to the second module specific resource lines of the system bus. The module specific resources for the third, fourth, fifth and sixth measurement module will respectively come from the third, fourth, fifth and sixth module specific resource lines of the set of module specific resource lines of the system bus.

The incremental bus structure 10 may be implemented external to the measurement modules. The bus structure element may be a cable having connectors at either end with one of the connectors being and input connector to the module and the other connector being a dual input and output connectors. The input connector of the cable is connected to the system bus and the input connector of the dual connector of the cable is coupled to an input connector in a first measurement module. The input connector of a second bus structure element is connected to the output connector of the dual connector connected to the first measurement module. The input connector of dual connector of the second bus structure element is connected to an input connector of the second measurement module. Additional modules may be connected in a daisy chain fashion to the system bus using the incremental bus structure elements.

An incremental bus structure has been described that is useable in a modular measurement instrument system. The incremental bus structure has a system bus with at least one set of N module specific system resource lines and common resource lines and incremental bus structure element. The incremental bus structure element has input and output electrically conductive contacts with set of contacts being coupled to the common system resource lines. The incremental bus structure element has at least one set of N input and output electrically conductive contacts corresponding with the set of N electrically conductive lines with the first input electrically conductive contact of the set being electrically coupled to electronic elements in a the measurement module and the second and remaining input electrically conductive contacts of the set being offset and electrically coupled to the first and subsequent output electrically conductive contacts of the bus structure element. Additional increment bus structure elements associated with additional measurement modules may be connected to previous incremental bus structure elements to extend the bus structure to other measurement modules.

Thus, an incremental bus structure and associated incremental bus structure elements usable in a modular measurement instrument has been described. Whereas many alteration and modifications to the present invention will be comprehended by a person skilled in the art after having read the foregoing description, it is to be understood that the particular embodiments shown and described by way of illustration are in no way intended to be considered limiting. References to details of particular embodiments are not intended to limit the scope of the appended claims.

What is claimed is:

1. An incremental bus structure element comprising:

an input interface connector having at least first and second electrically conductive input contacts;

an output interface connector having at least first and second electrically conductive output contacts; and a flexible substrate having at least first and second electrically conductive lines formed thereon with one end of the first and second electrically conductive lines electrically connected to the respective first and second electrically conductive input contacts of the input interface connector and the other end of the first electrically conductive line coupled to an electronic element and the other end of the second electrically conductive line connected to the first electrically conductive output contacts of the output interface connector.

2. An incremental bus structure comprising:

a system bus having a plurality of electrically conductive lines;

a first interface connector having at least first and second input contacts and first and second output contacts with the second input contact connected to the first output contact;

a first of the electrically conductive lines coupled through the first input contact of the first interface connector to a first electronic element and a second of the electrically conductive lines coupled through the second input contact to the first output contact;

a second interface connector having at least first and second input contacts and first and second output contacts with the first and second output contacts of the first interface connector electrically coupled to the first and second input contacts of the second interface connector and the second input contact of the second interface connector connected to the first output contact of the second interface connector; and the second of the electrically conductive lines coupled through the first input contact of the second interface connector to a second electronic element.

3. The incremental bus structure as recited in claim 2 wherein each of the first and second interface connector further comprising:

an input interface connector having the first and second electrically conductive input contacts;

an output interface connector having the first and second electrically conductive output contacts; and a flexible substrate having at least first and second electrically conductive lines formed thereon with one end of the first and second electrically conductive lines electrically connected to the respective first and second electrically conductive input contacts of the input interface connector and the other end of the first electrically conductive line coupled to the electronic element and the other end of the second electrically conductive line connected to the first electrically conductive output contacts of the output interface connector.

4. The bus structure as recited in claim 2 wherein the first and second electrically conductive lines are address lines coupling first and second address signals to the respective first and second electronic elements.

5. The bus structure as recited in claim 2 wherein the first and second electrically conductive lines are clock signal lines coupling a clock signal to the first and second electronic elements.

6. The bus structure as recited in claim 2 wherein the first and second electrically conductive lines are request service lines coupling first and second request service signals from the respective first and second electronic elements.

7. The bus structure as recited in claim 2 wherein the first and second electrically conductive lines are power-on signal lines coupling first and second power-on signals to the respective first and second electronic elements.

8. A modular measurement instrument having an incremental bus structure comprising:

a base unit having an instrument bus consisting of electrically conductive lines that are electrically coupled to corresponding electrically conductive contacts of an instrument bus interface connector with the instrument bus having a plurality of sets of N electrically conductive lines; and a first measurement module having an interface connector containing input and output electrically conductive contacts with the input electrically conductive contacts of the first measurement module interface connector being electrically coupled to the electrically conductive contacts of the instrument bus interface connector;

wherein the measurement module interface connector has corresponding sets of N input and output electrically conductive contacts with the first input electrically conductive contact of each set being electrically coupled to the measurement module and the second and remaining input electrically conductive contacts of each set being offset and electrically coupled to the first and subsequent output electrically conductive contacts of each set.

9. The modular measurement instrument as recited in claim 8 wherein one of the sets of N electrically conductive lines are address lines with a first of the electrically conductive lines of the set coupling an address signal to the measurement module.

10. The modular measurement instrument as recited in claim 8 wherein another of the sets of N electrically conductive lines are clock signal lines with a first of the electrically conductive lines of the set coupling a clock signals to the measurement module.

11. The modular measurement instrument as recited in claim 8 wherein another of the sets of N electrically conductive lines are request service lines with a first of the electrically conductive lines of the set coupling a request service signal from the measurement module.

12. The modular measurement instrument as recited in claim 8 wherein another of the sets of N electrically conductive lines are power-on signal lines with a first of the electrically conductive lines coupling a power-on signal to the measurement module.

13. The modular measurement instrument as recited in claim 8 further comprising additional measurement modules with each module having an interface connector containing input and output electrically conductive contacts with the input electrically conductive contacts of each of the additional measurement module interface connectors being electrically coupled to the output electrically conductive contacts of another of the measurement module interface connectors;

wherein each of the measurement module interface connectors has at least one set of N input and output electrically conductive contacts corresponding with the set of N electrically conductive lines with the first input electrically conductive contact of the set for each measurement module interface connector being electrically coupled to the corresponding measurement module and the second and remaining input electrically conductive contacts of the set being offset and electrically coupled to the first and subsequent output electrically conductive contacts of the set.

14. The modular measurement instrument as recited in claim 13 wherein the instrument bus further comprises a plurality of sets of N electrically conductive lines with each of the measurement module interface connectors having corresponding sets of N input and output electrically conductive contacts with the first input electrically conductive contact of each set in each of the measurement module interface connectors being electrically coupled to the corresponding measurement module and the second and remaining input electrically conductive contacts of each set in each of the measurement module interface connectors being offset and electrically coupled to the first and subsequent output electrically conductive contacts of each set.

15. The modular measurement instrument as recited in claim 14 wherein each of the measurement module interface connectors further comprise:

an input interface connector having electrically conductive input contacts corresponding to the electrically conductive lines of the instrument bus;

an output interface connector having electrically conductive output contacts corresponding to the electrically conductive input contacts; and a flexible substrate having electrically conductive lines formed thereon with the electrically conductive lines having a plurality of sets of N electrically conductive lines corresponding to the sets of N electrically conductive lines of the instrument bus where the first ends of the sets of N electrically conductive lines are electrically connected to the corresponding electrically conductive input contacts of the input interface connector and the other ends of each of the first electrically conductive lines of each of the plurality of sets of N electrically conductive lines are coupled to the measurement module and the other ends of the second and subsequent electrically conductive lines of each of the plurality of N electrically conductive lines are offset and connected to the first and subsequent electrically conductive output contacts of the output interface connector.

16. The modular measurement instrument as recited in claim 15 wherein one of the sets of N electrically conductive lines are address lines coupling address signals to the measurement modules.

17. The modular measurement instrument as recited in claim 15 wherein another of the plurality of sets of N electrically conductive lines are clock signal lines coupling clock signals to the measurement modules.

18. The modular measurement instrument as recited in claim 15 wherein another of the plurality of sets of N electrically conductive lines are request service lines coupling request service signals from the measurement modules.

19. The modular measurement instrument as recited in claim 15 wherein another of the plurality of sets of N electrically conductive lines are power-on signal lines coupling power-on signals to the measurement modules.

20. A modular measurement instrument architecture comprising:

a base unit having an instrument system bus;

a first measurement module connected to the base unit having a portion of the instrument system bus disposed therein and coupled to the instrument system bus in the base unit; and a plurality of additional measurement modules with the second and subsequent modules connected to the previous module and each module having a portion of the instrument system bus disposed therein that is coupled an instrument system bus portion in a previous module to extend the instrument system bus from module to module.

* * * * *